UNITED STATES PATENT OFFICE.

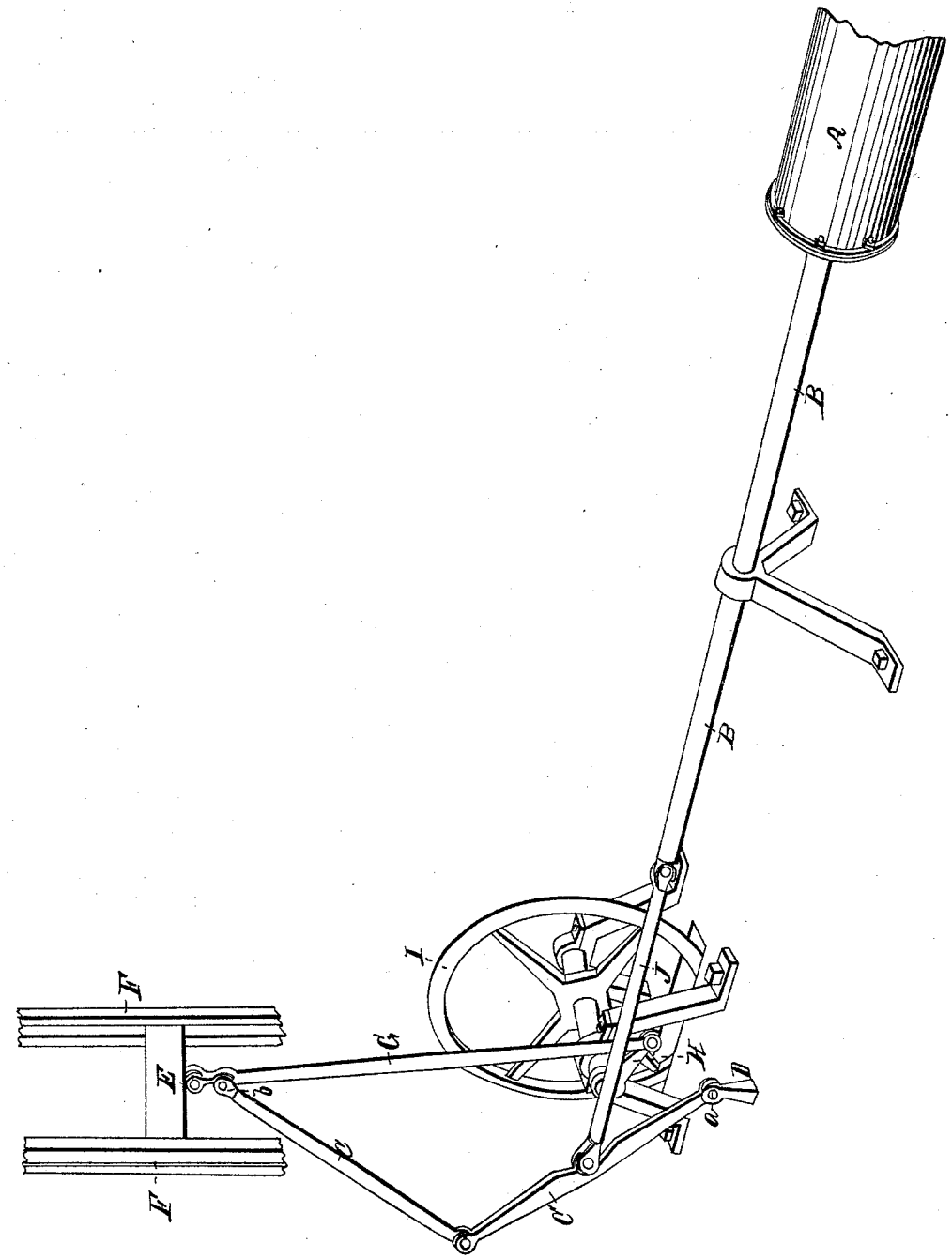

CHARLES JOHNSON, OF AMITY, ILLINOIS.

MANNER OF ACTUATING A FLY-WHEEL OR SLIDE SO AS TO MULTIPLY ITS MOTION.

Specification of Letters Patent No. 2,295, dated October 11, 1841.

*To all whom it may concern:*

Be it known that I, CHARLES JOHNSON, of Amity, in the county of Bond and State of Illinois, have invented a new and useful mode of accelerating the motion of a fly-wheel or slide which is actuated by the reciprocating motion of a sliding shaft, connecting-rod, piston, or other analogous device, by which manner of accelerating the motion of the fly-wheel various useful results may be attained; and I do hereby declare that the following is a full and exact description thereof.

When a fly-wheel is made to revolve by being directly connected with a vibrating shaft, piston, or other body that gives motion to the fly-wheel, it requires a complete vibration, or a motion back and forth, of the shaft or piston, to produce an entire revolution of the wheel; and when it has been desired to accelerate the motion of the wheel, this has usually been effected by cogged gearing. My invention consists in a particular manner of connecting a vibrating shaft, or piston, with two progressive levers, which constitute what is usually called a toggle joint, and of operating the crank on the shaft of the fly-wheel by means of a connecting rod which is actuated by the combined levers, or toggle joint.

In the accompanying drawing, A, represents a part of the piston of a steam engine, from which proceeds the rod B, B, which may be supposed to be its piston rod. The rod B, B, may, however, represent any shaft, or reciprocating rod, moving back and forth by the power of water, or of animals, or by the aid of any other motive power which may be applied to it.

C, C', are the progressive, or toggle joint, levers; that marked C', is connected at its lower end by a joint pin a, to a stationary standard D, attached to a floor, or other fixture; and that marked C, is connected by a joint pin b, to a slide E, working in guide grooves in the cheeks F, F. A shackle bar, or connecting rod, G, is also jointed to the slide E, and to the lever C, at its upper end, and at its lower, it embraces the crank pin of the crank H, on the shaft of the fly-wheel I. The rod B, is connected to the progressive levers, or toggle joints by the connecting rod, or shackle bar J. By this arrangement of the respective parts, as described, the fly-wheel I, will perform a complete revolution by the motion of the reciprocating rod B, in one direction, and another complete revolution by its motion in the reverse direction, the progressive levers being so arranged and connected with the rod B, by the connecting rod J, as that said levers shall traverse to the same distance on each side of that position in which they are in a line with each other. The connecting rod J, may be jointed to either of the levers C, C', and to any part of them that may be found convenient; or it may be jointed to them by the same pin by which they are connected with each other. The length of the progressive levers, of the connecting rod G, of the crank H, and of the stroke of the rod, or vibrating shaft, B, must be duly adjusted, so as to work in harmony with each other.

The fly-wheel thus connected and combined, from the velocity with which it moves, will not require to exceed in weight one half of that which would be necessary under the ordinary arrangement of the crank and connecting rod. And supposing the slide E, to represent a saw frame, it would have two vibrations for one of the rod B. If motion be taken from the fly-wheel shaft, the velocity communicated will, also, be twice as great as that obtained under the usual mode of connection.

It is not pretended that there is any actual gain of power effected by the above described arrangement of levers and connecting rods; but its design is to obtain the accelerated motion without the use of bands and whirls, or of cog gearing, which is generally employed; thus preventing loss by friction, and which motion may be applied to a variety of useful purposes in the propelling of machinery.

Having thus fully described the nature of my invention and explained the manner in which the same operates, what I claim therein, and desire to secure by Letters Patent, is—

The combining of the progressive, or toggle joint, levers, with a reciprocating shaft, with a slide, and with the crank of a fly-wheel, for the purpose, and in the manner, herein set forth.

CHARLES JOHNSON.

Witnesses:
WILLIAM MILLS,
H. S. MORRILL.